T. TRIPP.
Piston-Packing.
No. 225,308.   Patented Mar. 9, 1880.
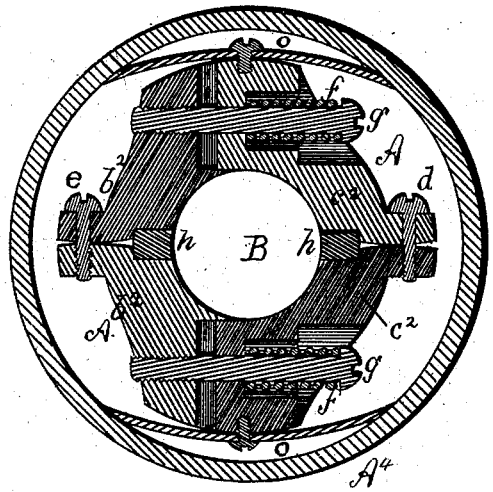
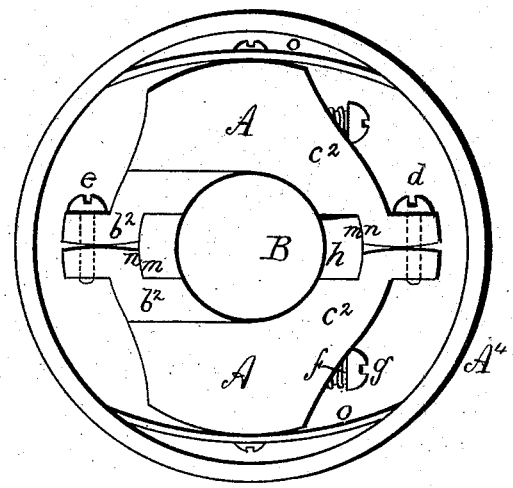
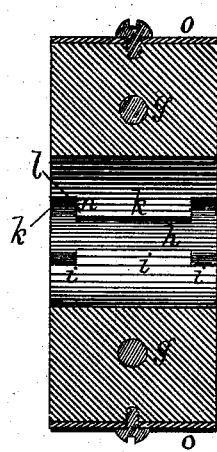
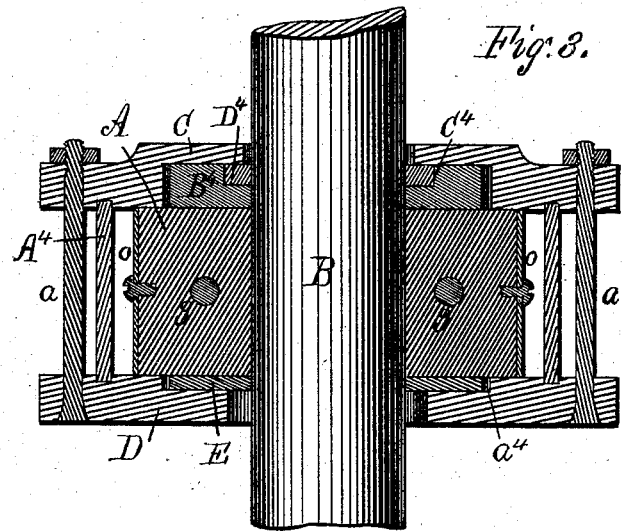
Witnesses.
J. M. Tammany Jr.
H. B. Lodge
Inventor.
Thomas Tripp.
F. Curtis, Atty.

UNITED STATES PATENT OFFICE.

THOMAS TRIPP, OF EAST STOUGHTON, MASSACHUSETTS, ASSIGNOR TO THE AMERICAN METALLIC PACKING ASSOCIATION.

PISTON-PACKING.

SPECIFICATION forming part of Letters Patent No. 225,308, dated March 9, 1880.

Application filed January 17, 1880.

*To all whom it may concern:*

Be it known that I, THOMAS TRIPP, of East Stoughton, in the county of Norfolk and State of Massachusetts, have invented certain Improvements in Metallic Packings for Piston and other Rods, of which the following is a specification.

These improvements relate to a class of sectional metallic packings for piston or valve rods of steam-engines, &c., shown and described in Letters Patent of the United States issued to myself on the 23d day of August, A. D. 1879, and numbered 219,883, the distinguishing features of which consist in the employment of twin semi-rings capable of sliding upon one another in a plane at right angles to the axis of the rod, and being maintained in a uniform plane by suitable guides, and crowded up to the rod from opposite sides by means which are controlled and adjusted from the outside of the cylinder-head, an important element in this class of packings being seen in the fact that it is susceptible of lateral slip upon the cylinder-head by and with any eccentric movements of the rod should the latter become bent or out of true from any cause.

In said patented device the sectional or semi rings are crowded up to the rod from opposite sides by bolts screwing into the outer end of each ring and swiveled to a suitable part or projection of the opposite ring, while to prevent separation of the rings I employ two lugs projecting laterally inward from the inner face of the annular disk, which encompasses the rod outside of the rings, and an adjusting-screw or its equivalent being employed with each lug, and bearing against the outer edge of each ring to compel a close bearing between the sides of the periphery of the ring and the rod, and to vary the degree of friction between them should it be found necessary or desirable.

The drawings accompanying this specification represent, in Figure 1, end view with outer plate removed; Fig. 2, a section through rings, showing joint; Fig. 3, section of packing, and Fig. 4 section of packing also.

My present device is constructed as follows: A represents the sectional rings as embracing opposite sides of the piston-rod, which is shown at B, while C represents an annular disk loosely encompassing such rod, and confined or connected to an annular head, D, which also encompasses the rod by two or more bolts, $a\ a$, while the last-named head D is rigidly bolted to the cylinder-head or to the outstanding flange in which such cylinder-head usually terminates. I term the sectional packing-plates "semi-rings," for the reason that the corresponding portions of metallic-rod packings in general are styled "sectional rings," and because their united bores constitute a cylindrical bearing which embraces the rod. Between the disk C and head D, and securely confined therein by the bolts $a\ a$, I place a cylinder, $A^4$, which, with the disk and head, constitutes a box or case to inclose the various parts of the packing, and protects them from dust or dirt, and to receive such small amount of condensed water as may find its way to this point, but more especially to prevent the bolts, when screwed up tight, from unduly binding the packing-rings between the said disk and head. Upon the outside of the rings, A A, and between them and the disk C, I encompass the rod with a flat metallic ring, $B^4$, which contains, in a rabbet, $C^4$, formed in it, an elastic or soft packing-ring, $D^4$, which tightly encircles the rod and prevents escape of such minute portions of steam as may pass the packing-rings. In practice the ring $D^4$ will probably not be needed; but I add it as an extra precaution.

The packing-rings A A are flat upon their end faces, and between them and the head D I interpose a washer or annulus, E, which closely encircles the rod, and is let into a rabbet, $a^4$, of larger diameter, created in the head, in order that the annulus, and with it the rings A A, may be permitted lateral slip to accommodate any irregular or eccentric movements of the piston-rod, and thereby relieve the packing from thrusts and strains, which would otherwise devolve upon it, in case of bending or other injury to the rod. The annulus serves to maintain a steam-tight joint between the head or exterior of the cylinder and the rings, and yet permit of the lateral play last explained.

In the present instance the rings A A are each formed in two parts or halves, $c^2 c^2$ and $b^2 b^2$, the ring $b^2 b^2$ being inclosed between and sliding within the arms of the ring $c^2 c^2$, the two rings being crowded up to the rod B, and so as to hug it closely, by springs $f f$, which are disposed upon opposite sides of the ring $c^2 c^2$ and encircle the ends of the bolts $g g$, which latter pass loosely through the said ring $c^2 c^2$ and screw into the ring $b^2 b^2$, the springs exerting their stress between the said ring $c^2 c^2$ and the heads of the bolts, thereby drawing the two rings together upon opposite sides of the rod B. The outer ends of the halves $b^2 b^2$ or $c^2 c^2$ of each ring are confined together by a bolt, $d$ or $e$, which passes at its head end loosely through one of the rings and screws into the other, in order that a slight rocking motion may be permitted between the said two halves $b^2 b^2$ or $c^2 c^2$ of the rings to enable their common bore to be contracted, if occasion requires.

To effectually seal the joint between the two parts of each ring and the rod B, I employ an intermediate block, $h$, of soft or hard metal or other material let into the bore of the ring, and I secure this block tightly to one half of the ring, as shown at $i i i$, and so that it shall be a permanent part of the latter, and move with it toward or away from the other half in the event of separation or contraction of the arms or sides of the ring; but in order that a tight joint may be secured between the two halves of the ring, and yet permit of these movements, I form the meeting-faces of the intermediate block and the opposite half of the ring with one or more indentations and spurs, $k$, in order to provide lateral bearings or joints $l l$ (see Fig. 2 of the drawings) which shall be steam-tight under all circumstances. Furthermore, the outer edge, $m$, of each block $h$, which is in contact with the opposite half of the ring, should be a close joint with that part $n$ of the latter with which it is in contact, (see Fig. 1,) and this joint should be as nearly as possible such an arc of a circle as shall permit of separation or contraction of the halves of the ring or rocking movements of the ends thereof without separation of the parts $m$ and $n$, before described.

The block $h$ may be dispensed with and the spurs and indentations $k$ formed directly upon the halves of the ring; but I prefer to employ a soft-metal block in this locality.

In lieu of making the packing-rings in halves joined together, with provisions for loose rocking motion or contraction and expansion, such rings may be in one entire piece, and the necessary expansion or contraction obtained by the inherent elasticity or spring of the metal.

In order that the two sides of the outermost or larger ring, $c^2 c^2$, may closely hug the rod B as well as the sides of the ring $b^2 b^2$ under all circumstances, I employ with each side of said ring $c^2 c^2$ a spring, $o$, which exerts its stress between the outside of the ring and the inner periphery of the cylinder or case $A^4$.

By my construction, as above described, the bore of any given packing may be reduced in diameter, if desired. To accomplish this it is only necessary to file down the meeting-faces of the halves of the ring, which will contract the bore, and the bore may then be rebored to a true circle; or if the bore of any packing should become scratched or otherwise injured it may be rebored by pursuing the same course.

I claim—

1. The packing-rings as composed of two parts or halves joined together at one end, in the manner substantially as herein shown and described, to permit of variable or rocking or expansion or contraction movements of the two ends.

2. The combination, with the disk C, head D, and rings A A, of the cylinder or case $A^4$, which serves to protect and cover all the details of the packing.

3. The semi-rings, composed each of two parts, $b^2 c^2$, connected by an elastic or spring connection, as described, said semi-rings being jointed together at their outer ends, in the manner shown and set forth, to permit a rocking motion of their several parts to and from the rod which they encompass.

4. The intermediate block, secured permanently to one ring, and formed with spurs and notches to engage corresponding spurs and notches in the opposite ring and maintain a tight joint with the latter during rocking movements or expansion and contraction of the two halves of the ring.

5. In combination with the ring $c^2 c^2$ and the cylinder $A^4$, the springs $o o$, substantially as and for purposes stated.

6. In combination, the disk C, head D, cylinder $A^4$, rod B, rings $b^2 b^2$ and $c^2 c^2$, annulus E, and elastic or soft packing $D^4$, substantially as and for purposes stated.

THOMAS TRIPP.

Witnesses:
F. CURTIS,
H. E. LODGE.